United States Patent
Uddin et al.

(10) Patent No.: US 9,874,347 B1
(45) Date of Patent: Jan. 23, 2018

(54) BATCH-CYCLIC REDOX REACTOR WITH AIR-ONLY TUYERES

(71) Applicants: Mohammad Helal Uddin, Reno, NV (US); Charles J. Coronella, Reno, NV (US); Marisa Anne Zuzga, San Francisco, CA (US)

(72) Inventors: Mohammad Helal Uddin, Reno, NV (US); Charles J. Coronella, Reno, NV (US); Marisa Anne Zuzga, San Francisco, CA (US)

(73) Assignees: ZERE ENERGY AND BIOFUELS, INC., San Bruno, CA (US); UNIVERSITY OF NEVADA, RENO, Reno, NV (US)

( * ) Notice: Subject to any disclaimer, the term of this patent is extended or adjusted under 35 U.S.C. 154(b) by 0 days.

(21) Appl. No.: 14/631,598

(22) Filed: Feb. 25, 2015

Related U.S. Application Data

(60) Provisional application No. 61/966,573, filed on Feb. 25, 2014.

(51) Int. Cl.
| | |
|---|---|
| *B01J 8/18* | (2006.01) |
| *F27B 15/00* | (2006.01) |
| *F23C 10/01* | (2006.01) |
| *F23C 10/20* | (2006.01) |
| *F23C 10/22* | (2006.01) |

(52) U.S. Cl.
CPC .............. *F23C 10/01* (2013.01); *F23C 10/20* (2013.01); *F23C 10/22* (2013.01)

(58) Field of Classification Search
USPC ............ 431/7; 422/129–133; 423/414, 447.8
See application file for complete search history.

(56) References Cited

U.S. PATENT DOCUMENTS

| | | | | |
|---|---|---|---|---|
| 4,076,796 A | * | 2/1978 | Reh .......................... | B01J 6/004 34/371 |
| 5,891,401 A | * | 4/1999 | D'Acierno ................. | B01J 8/44 110/245 |
| 6,991,767 B1 | * | 1/2006 | Staffin ..................... | B01J 8/1818 164/401 |
| 7,803,268 B2 | * | 9/2010 | Orth ........................ | C10B 49/10 122/4 D |
| 8,277,736 B2 | * | 10/2012 | Proll ....................... | B01J 8/1818 422/129 |
| 8,601,958 B2 | * | 12/2013 | Salatino ................ | F23C 10/002 110/245 |

* cited by examiner

*Primary Examiner* — Nina Bhat
(74) *Attorney, Agent, or Firm* — Lorraine S. Hirsch

(57) ABSTRACT

A reactor system includes plural batch-cyclic reduction/oxidation (redox) reactors. One reactor is operated in fuel mode while another is operated in air mode, and vice-versa. For each reactor in air mode, air is introduced via air-only tuyeres and via fuel-air tuyeres to oxidize oxidation particles. For each reactor in fuel mode, fuel is introduced via the reactor's fuel-air tuyeres and not via its air-only tuyeres. As a result, air is introduced at a higher rate than fuel is introduced so that the oxidation rate can match the reduction rate. Thus, for example, as few as two reactors can be used for continuous power generation without having to shuttle oxidation particles between reactors.

18 Claims, 9 Drawing Sheets

BATCH-CYCLIC REDOX REACTOR WITH AIR-ONLY TUYERES

CROSS-REFERENCE TO RELATED APPLICATION

This application claims the benefit of, and incorporates by reference, U.S. Provisional Patent Application No. 61/966,573 filed Feb. 25, 2014.

BACKGROUND

Power and heat can be produced by combustion of hydrocarbons, e.g., including fossil and synthetic fuels. Air is a readily available source of the oxygen required in combustion reactions. However, it can be difficult to protect the environment from greenhouse gases, e.g., carbon dioxide, produced in air-based combustion reactions.

Reduction/oxidation (redox) reactors address this problem by providing for inherent carbon-dioxide capture. In a redox system, power is generated by oxidizing metal particles to yield metal-oxide particles. The metal-oxide particles can then be reduced in a reduction reaction with hydrocarbon fuel for use in a next redox cycle. The oxidation reaction does not produce carbon dioxide. The reduction reaction yields carbon dioxide and steam. The steam can be readily separate out so that the carbon dioxide can be isolated and captured.

In a batch-cyclic redox reactor system, a batch-cyclic reactor alternates between an air mode and a fuel mode. In air mode, oxidation particles are oxidized, generating heat. In fuel mode, the oxidation particles are reduced without generating much heat. So that heat can be generated continuously, two or more batch-cyclic redox reactors can be operated out-of-phase with respect to each other so that at least one is in air mode at any given time.

However, the volume of gas needed during air mode is three to seven times the volume needed during fuel mode. This can be a challenge for reactors that rely on fluid flow to fluidize the oxidization particles to improve reaction characteristics. An alternative is to use additional reactors, e.g., so that three can be in air mode while one is in fuel mode. However, this considerably increases the entry cost for a redox reactor system.

A continuous-loop combustion (CLC) reactor system combines a reactor dedicated to reduction with a reactor dedicated to oxidation. Oxidation particles are continuously shuttled (looped) back and forth between the oxidation reactor and the reduction reactor so that heat generation can continue uninterrupted. The oxidation reactor can be design to provide whatever air flow is required to match the reduction rate of the reduction reactor. However, the equipment required to shuttle the oxidation particles between the oxidation and reduction reactors places a heavy burden on the entry cost for a redox reactor system.

What is needed is a combustion reactor that is both green and economical for moderately-sized installations. More specifically, what is needed is a more economical moderate-power redox reactor system.

DETAILED DESCRIPTION

Figure 1:
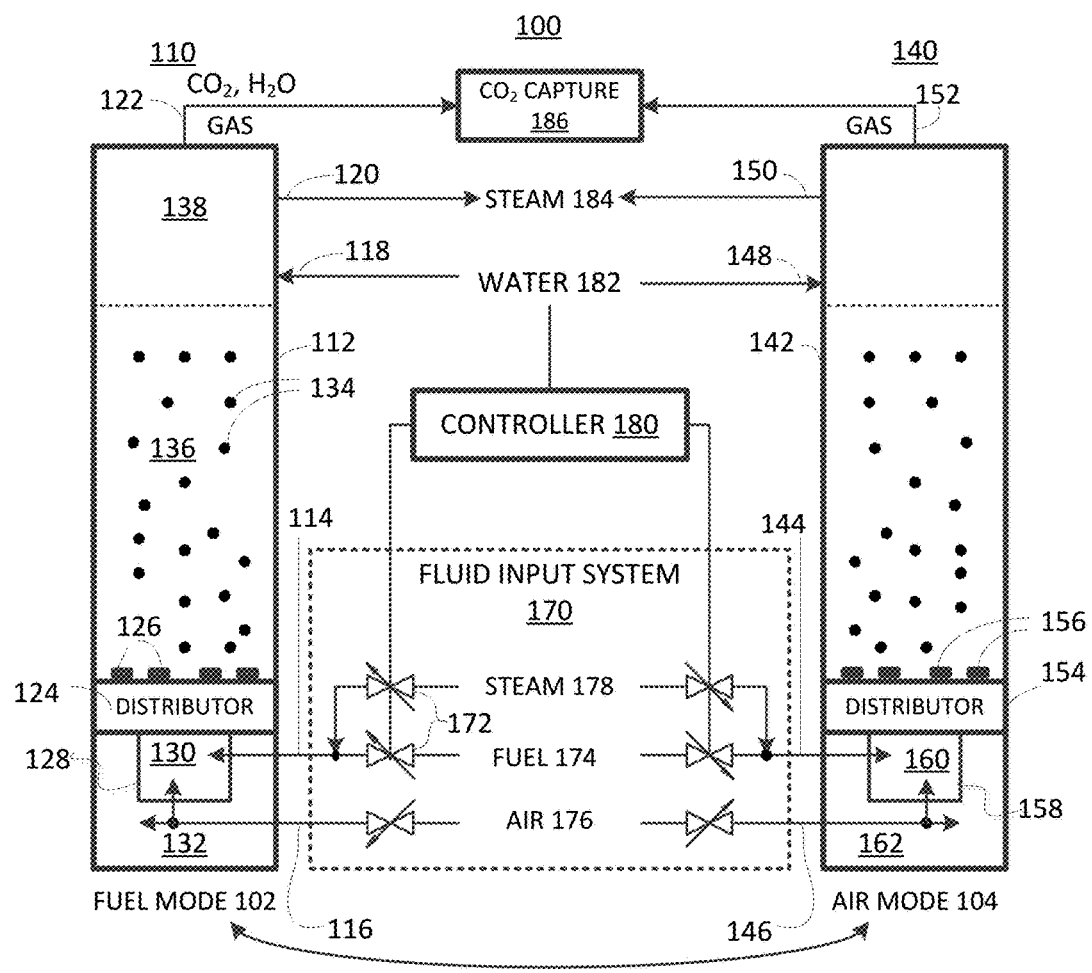
FIG. 1 is a schematic diagram of a batch-cyclic redox reactor system.

A batch-cyclic redox reactor system 100, shown schematically in FIG. 1, includes a pair of anti-synchronously operated batch-cyclic redox reactors 110 and 140, each of which can be operated in a fuel mode 102 and an air mode 104. Reactor system 100 is designed to input about 100 kilowatts (kW) continuously over multiple redox cycles. Each redox cycle can last about 10 minutes or 20 minutes for a full oxidation and reduction, depending on the formulation of the oxidation particles, divided between a fuel (reduction, combustion) phase and an air (oxidation, regeneration) phase. The prototype is designed for 100 kW thermal input; a commercial scale would be closer to a megawatt.

Figure 2:
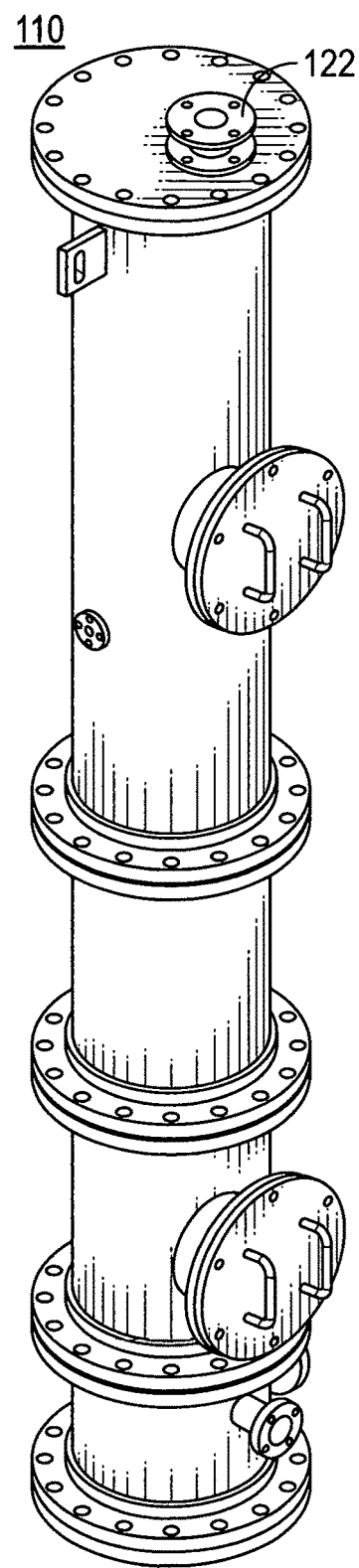
FIG. 2 is a perspective view of a batch cyclic redox reactor of the reactor system of FIG. 1.

Reactor 110, shown in perspective in FIG. 2, is generally cylindrical, and is about 3.827 meters tall. Reactor 110 has an outer diameter of about 45.7 cm and an inner diameter of 42.9 cm. Reactor 140 is nominally identical to reactor 110. Note: herein and elsewhere, specific parameter values are provided in the spirit of full disclosure of a particular embodiment and are not intended to limit the scope of the invention. These values can differ among embodiments; furthermore, not all parameters apply to all embodiments.

As shown in FIG. 1, reactor 110 has a vessel 112 with a fuel intake 114, an air intake 116, a water intake 118, a steam output 120, and a gas output 122. Vessel 112 is made of high-temperature steel alloy. One suitable steel alloy is 253 MA, an austentic steel with 24.5% Cr and 2.5% Si, sold by Sandvik. The reactor vessel may also be made out of ceramic material or ceramic/refractory line steel of a lower grade.

Within vessel 112 is a fluid distributor 124 with multi-jet tuyeres 126. Distributor 124 provides a pressure drop large enough to ensure good fluid distribution across the reactor cross section. Tuyeres 126 are designed to minimize jet velocity to minimize attrition of particles. In addition, tuyeres 126 minimize back flow of particles through the distributor when the gas flow is turned off.

Fluid exits tuyeres 126 to create turbulence to fluidize oxidation particles 134, forming a fluidized bed 136. Each reactor will be filled with 228 kg of particles. The particles are 300 micrometers, made with 30% copper wet impregnated on porous alumina. A range of 15% to 45% of copper is contemplated, using approximately 250 kg of particles. The top 1.0 m of vessel 112 serves as a freeboard 138 for particle disengagement and return to fluidized bed 136.

A cup 128 below distributor 124 divides a 10 cm high volume below distributor 124 into an inner plenum 130 and an outer plenum 132. Reactor 140 has a vessel 142 with a fuel intake 144, an air intake 146, a water intake 148, a steam output 150, and a gas output 152. Within vessel 152 is a distributor 154 with multi-jet tuyeres 156. A cup 158 below distributor 154 divides a volume below distributor 154 into an inner plenum 160 and an outer plenum 162.

Reactor system 100 includes a fluid input system 170, including valves 172, for providing fuel 174, air 176, and steam 178 to reactors 110 and 114. A controller 180 controls fluid input system 170 to implement fuel mode 102 and air mode 104. In addition, controller 180 controls a water source 182 that provides the water 184 that reactors 110 and 140 convert to steam 184, which can then be used as a source of steam, heat, and/or power (e.g., by driving a turbine). Reactor system 100 also includes a $CO_2$ capture unit 186 to limit the emission of carbon dioxide, a greenhouses gas. Controller 180 causes reactors 110 and 140 to operate in a complementary, antisynchronous, fashion: when reactor 110 is in fuel mode, reactor 140 is in air mode; and, when reactor 110 is in air mode, reactor 140 is in fuel mode. Since reactors 110 and 140 are nominally identical, the operation of reactor 140 can be discerned from the following detailed description of reactor 110 and its operation.

Figure 3:
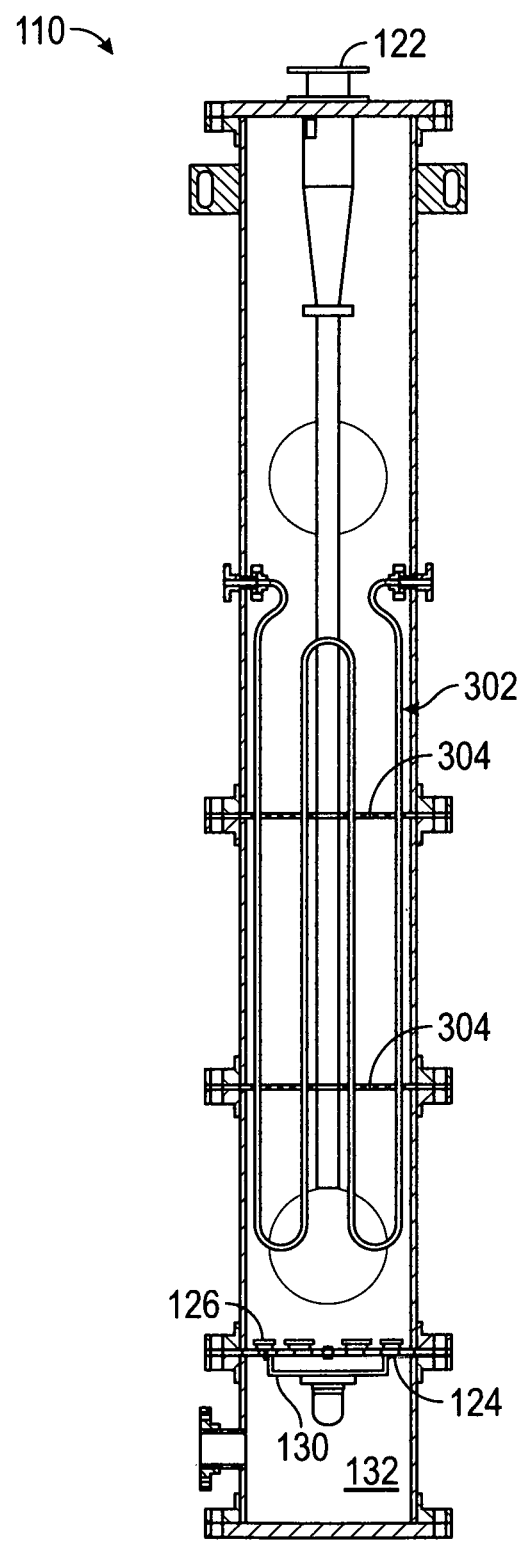
FIG. 3 is a sectional side view of the batch-redox reactor of FIG. 2.

As shown in FIG. 3, reactor 110 includes a heat exchanger 302, into which water is input and from which steam is output. Heat generated as a result of reduction (combustion) during fuel mode and as a result of oxidation during air mode can maintain the vessel interior at about 800° C. Some of this heat is conducted through a stainless steel wall of heat exchanger 302 to boil water and further heat the resulting steam. Heat exchanger is formed of ½-inch schedule 80 pipe made from high temperature steel. The flow of the water into heat exchanger 302 regulates the production of steam. Heat is extracted from each reactor 110, 140 primarily during air mode; during fuel mode, operation is essentially adiabatic (fuel reactor steam pipe heat extraction about 17.1 kW, fuel reactor exhaust about 11.8 kW). Heat exchanger 302 is designed to remove 14.5 kW from each reactor (29 kW total), with water entering at 40° C., and leaving as superheated steam at P=15.5 bar, T=210° C., at a rate of 0.0055 kg/s (in each reactor). Baffles 304 are arranged at respective vertical positions of vessel 112 to support heat exchanger 302 and to limit the growth of bubbles that would otherwise interfere with the oxidation and reduction reactions and the exchange of heat through heat exchanger 302.

When reactor 110 is in fuel mode, fuel, e.g., a mixture of $CH_4$ (methane) and $CO_2$ (carbon dioxide), is input to vessel 112 via fuel intake 114. As best discerned from FIGS. 4A and 4B, fuel intake 114 provides a channel to inner plenum 130, which is bounded from above by a plate tuyere 500, shown In FIGS. 5A and 5B. From inner plenum 130, fuel is forced up fuel-air tuyeres 502. As indicated in FIG. 5B, inner plenum 130 does not extend to air-only tuyeres 504, so fuel is not distributed by air-only tuyeres 504. Steam may be used for fluidization when pipeline natural gas is the fuel. The combustion of methane and $CO_2$ is a simulation of anaerobic digester gas.

Figure 6A:
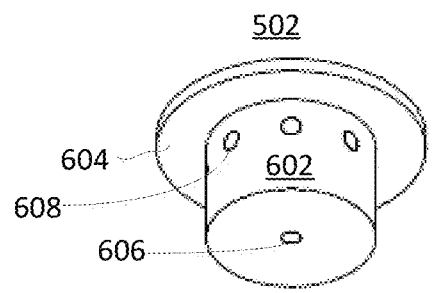
FIGS. 6A-6C are views of a fuel-air tuyere of the distributor of FIG. 5B. The views are, respectively: perspective (FIG. 6A), bottom sectional (FIG. 6B); and side sectional (FIG. 6C).
Figure 6B:
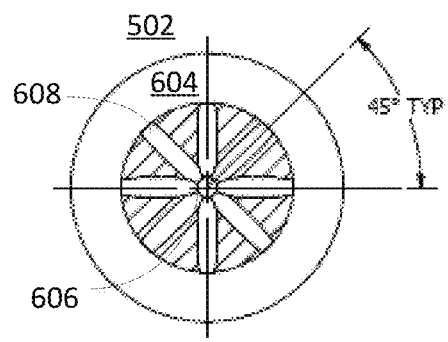
Figure 6C:
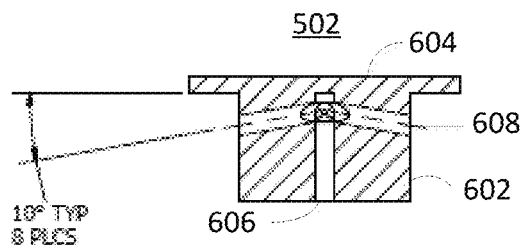

A fuel-air tuyere 502 is illustrated from several different perspectives in FIGS. 6A-6C. Fuel-air tuyere 502 has a base 602 covered by a cap 604. Base 602 is cylindrical, about 25 mm tall, and about 0.34 cm in diameter. Cap 604 is disk shaped, about 54 mm in diameter, and about 3 millimeters (mm) thick. Base 602 has a vertically extending channel, i.e., a "stem" 606, that extends to and is blocked by cap 604. Stem 606 is cylindrical, about 22 mm tall and is about 4.0 mm in diameter, and about 3 mm thick. The tuyeres are sized for the flow rate required; if the unit is sized up, the tuyere may be sized up or more may be added.

Since cap 604 blocks the vertical trajectory of fluid in stem 606, fluid is forced out of radial channels 608. As shown in FIG. 6C, each radial channel extends radially with a 10° downward incline. Each radial channel is cylindrical, extending about 17 mm from the axis of stem 606, and has a diameter of about 5 mm. As best seen in FIG. 6B, fuel-air tuyere 502 has eight radial channels 608, circumferentially and evenly spaced at a 45° angular pitch to provide for an omnidirectional output, as indicated by arrows in FIG. 5B. The flow rate of the jets exiting radial channels 608 is sufficient to cause turbulence in fluid bed 136 (FIG. 1) and to fluidize oxidation particles 134. As far as fluid dynamics are concerned, the flow through fuel-air tuyeres is about the same whether the fluid is fuel during fuel mode operation or air during air mode operation.

Figure 4A:
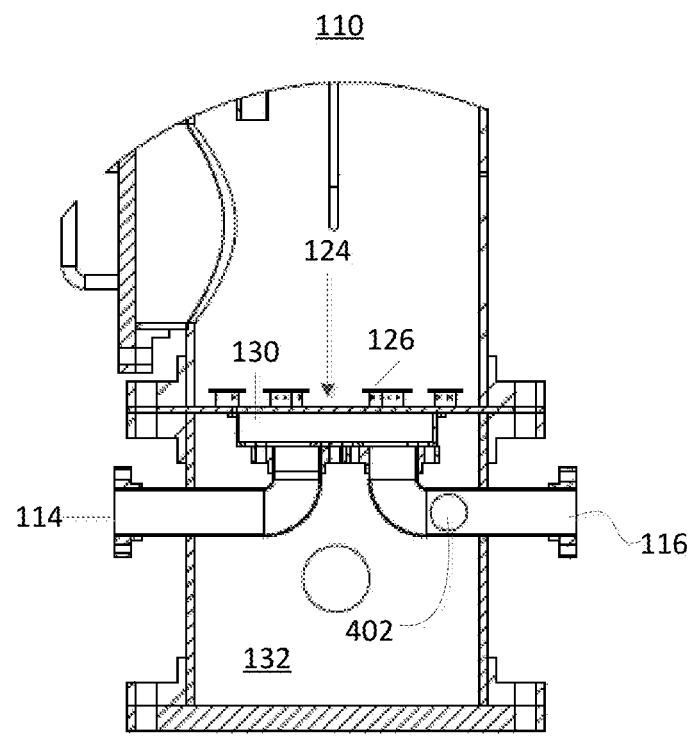
FIG. 4A is a sectional view of a lower portion of the reactor of FIG. 2 and shows a distributor and conduits.
Figure 4B:
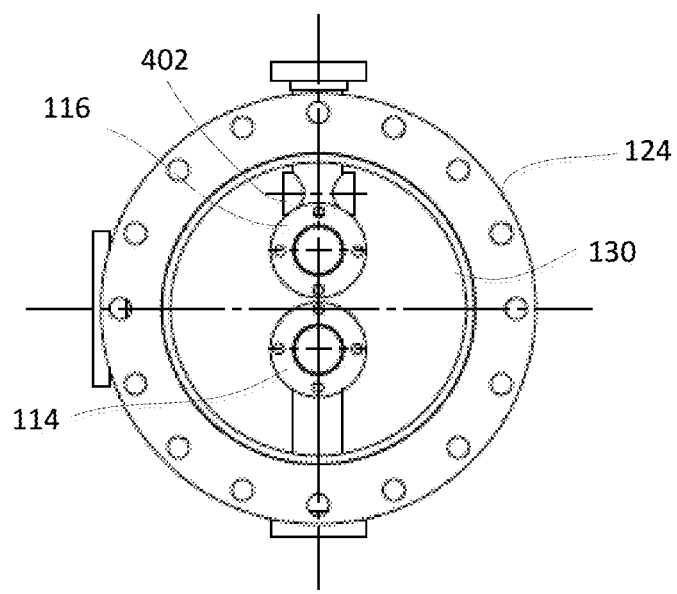
FIG. 4B is a plan view of the distributor and conduits of FIG. 4A.
Figure 5A:
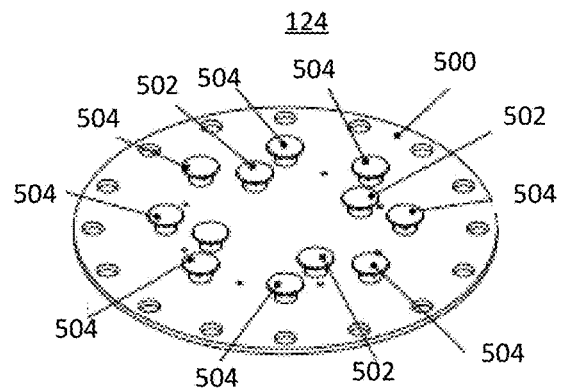
FIG. 5A is a perspective view of the distributor of FIG. 4B.
Figure 5B:
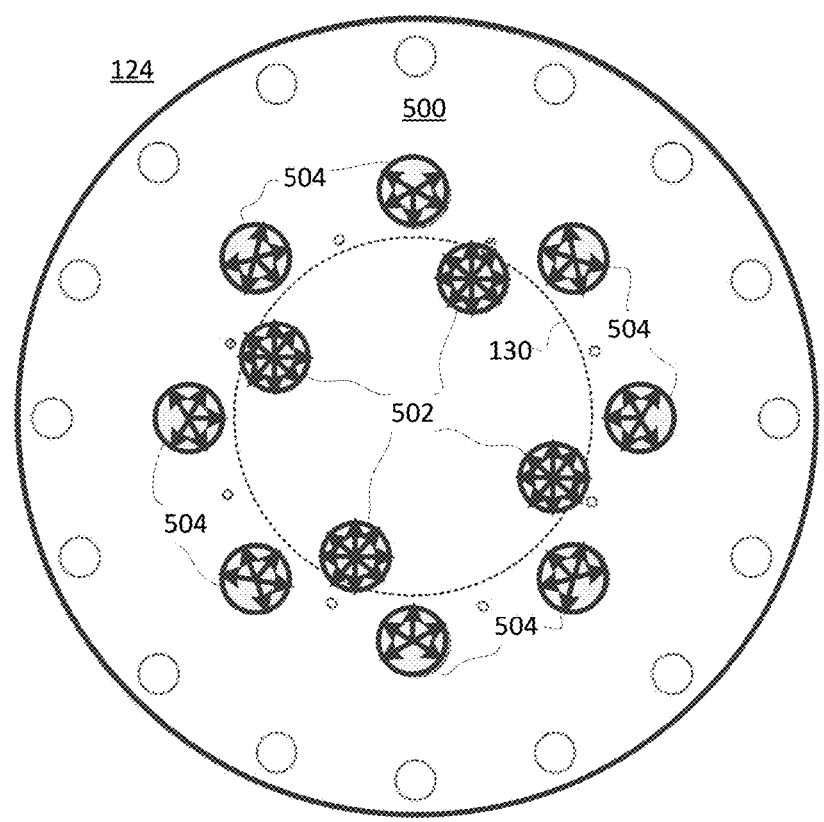
FIG. 5B is a schematic plan view of the distributor of FIG. 5A.

In air mode, air enters air intake 116, which guides air to inner plenum 130 and to outer plenum 132 via transverse apertures 402, shown in FIGS. 4A and 4B. That portion of air that enters inner plenum 130, proceeds through fuel-air tuyeres 402, as described above for fuel in inner plenum 130. That portion of air that enters outer plenum 132 is blocked from fuel-air tuyeres 502 by cup 128. However, air-only tuyeres 504 are accessible from outer plenum 132.

Figure 7A:
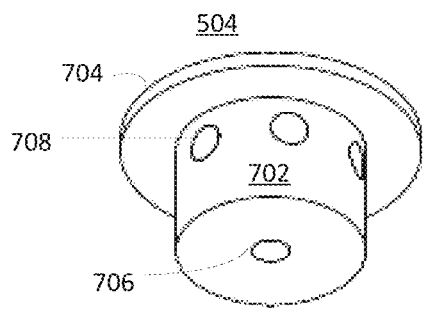
FIGS. 7A-7C are views of an air-only tuyere of the distributor of FIG. 5B. The views are, respectively: perspective (FIG. 7A); bottom sectional (FIG. 7B); and side sectional (FIG. 7C).
Figure 7B:
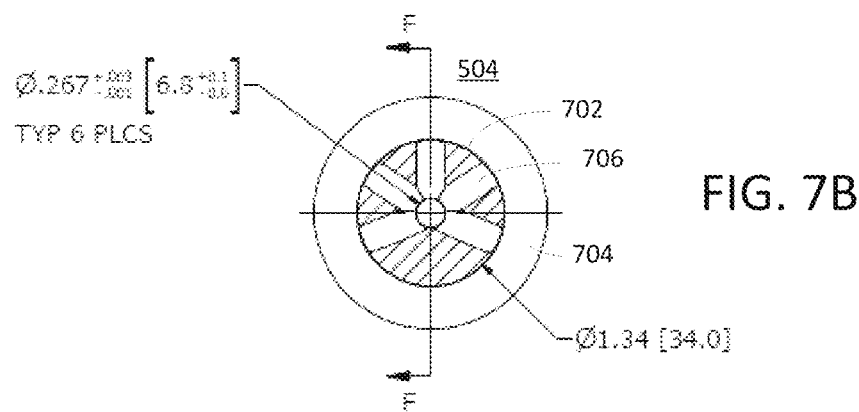
Figure 7C:
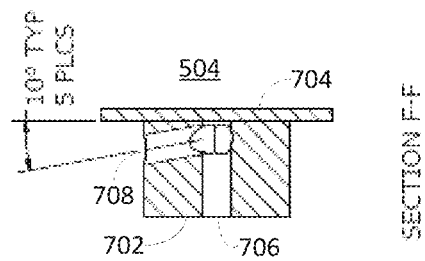

An air-only tuyere 504 is shown from several perspectives in FIGS. 7A-7C. Air-only tuyere has a base 702 and a cap 704. Base 702 is cylindrical, with a height of 22 mm and a diameter of 34 mm. Cap 704 is disk-shaped, with a diameter of 54 mm, and a thickness of 3 mm. Base 702 has a aperture stem 70 extending vertically and axially therethrough. Stem 706 is cylindrical, with a height equal to that of base 702 and a diameter of 26.7 mm. Cap 704 blocks passage of air beyond the top of base 702. Accordingly, air rising in stem 706 exits via radial channels 708, which have a 10° downward slope, as indicated in FIG. 7C. As shown in FIG. 7B, air-only tuyere 504 has five radial channels 708 arranged on about a 60° angular pitch, leaving about 120° without a radial channel. Air-only tuyeres are arranged as indicated in FIG. 5B with the blank 1200 facing the closest vessel wall surface, and a central radial channel pointing generally toward an axial center of plate tuyere 500.

As shown in FIG. 5B, there are eight air-only tuyeres 504 and four fuel-air tuyeres 502. In other words, twelve tuyeres are used to distribute air and four tuyeres are used to distribute fuel. In one design, ratio of tuyeres for air to tuyeres used to fuel is similar to the ratio of volume of air to volume of gas. In other designs, the ratio is greater or less than the volume ratio.

Figure 8:
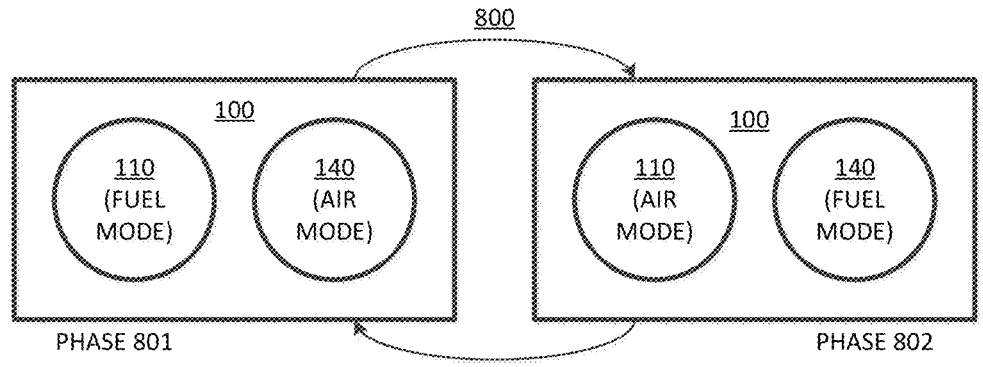
FIG. 8 is a two-phase state diagram for the reactor system of FIG. 1.

Controller 180 operates reactors 110 and 140 anti-synchronously so that one is in air (regeneration, oxidation) mode while the other is in fuel (combustion, reduction) mode so that power can be produced continuously by switching the modes back and forth as indicated in FIG. 8. At phase 801, reactor 110 is in fuel mode while reactor 140 is in air mode. At phase 802, reactor 110 is in air mode while reactor 140 is in fuel mode. Due to the inclusion of the air-only tuyeres, power generation can continue indefinitely through multiple redox cycles, which with a phase 801 and a phase 802.

Figure 9:
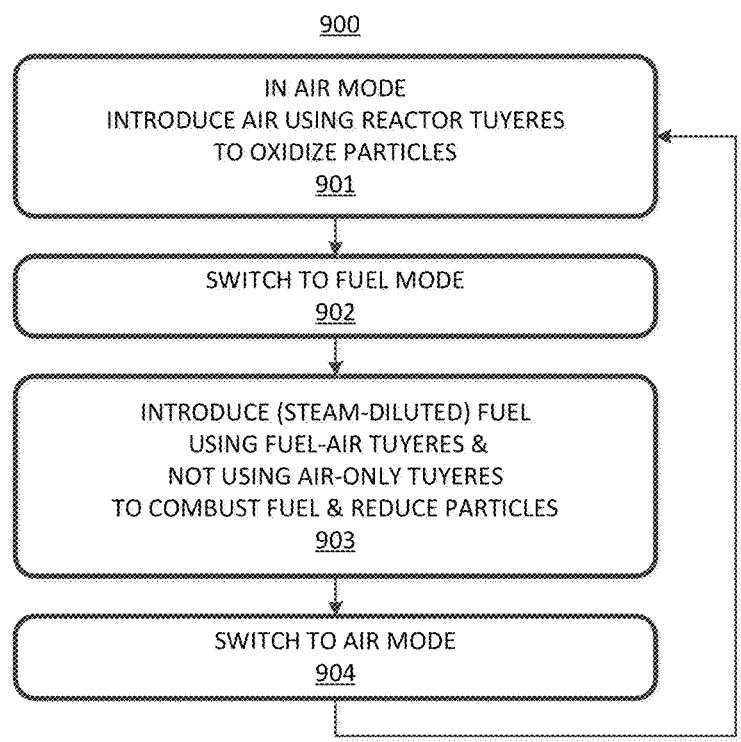
FIG. 9 is a flow chart of a cyclical process for operating a reactor system such as that of FIG. 1.

A process 900 of operating a reactor is flow-charted in FIG. 9. At 901, in an air mode, air is introduced into a reactor through multi-jet tuyeres to oxidize particles. At 902, the reactor is switched to fuel mode. At 903, while in fuel mode, fuel is introduced into the reactor through fuel-air tuyeres and not through air-only tuyeres. The fuel reacts with and is combusted by the oxidation particles, which are reduced to metal in the process. At 904, the reactor is switched to air mode. Steps 901-904 are iterated to provide continuous power output over multiple redox cycles.

While power-generation system 100 operates a pair of reactors in complementary fashion to provide economically for continuous and ecologically friendly power generation, other embodiments of the invention employ one reactor or more than two reactors. For example, where continuous combustion is not required a single reactor can be used, e.g., to contribute to a power grid or for temporary standby power. In some scenarios, the ratio of the amount of air required to regenerate (oxidize) oxidation particles over the amount of fuel used during combustion (reduction), that, even with the extra air-only tuyeres, more than one reactor must be in air mode to regenerate oxidization particle for a single reactor in fuel mode. In such cases, the present invention can reduce the number of reactors required to be in air mode and, thus, the total number of reactors. Another embodiment requires the use of larger diameter reactors; in this case, the number of tuyeres used for air/fuel and for air only is increased, while maintaining the ratio of air/fuel tuyeres to approximately 3:1. Finally, additional reactors in both fuel mode and air mode may be used where higher power output is required.

Figure 10:
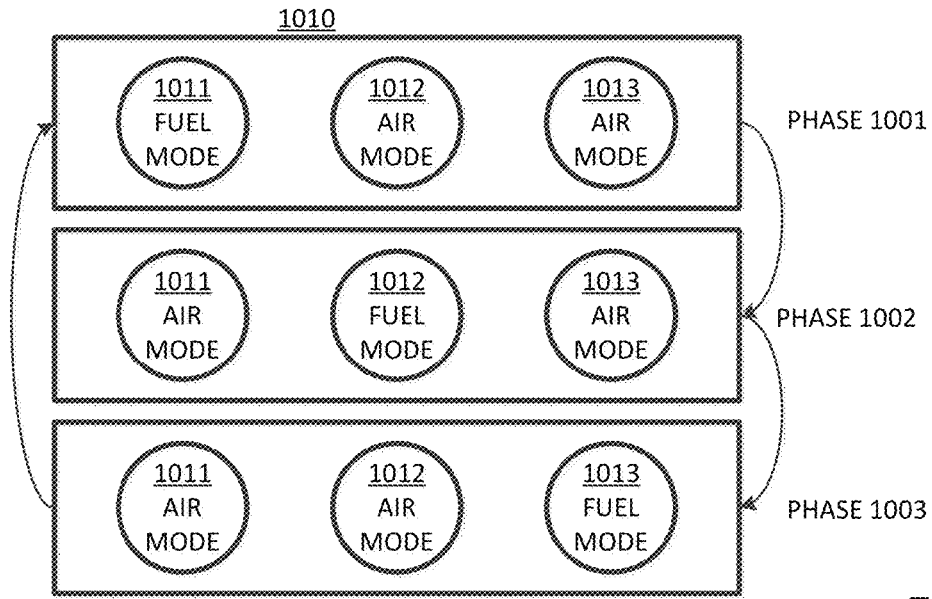
FIG. 10 is a three-phase state diagram for a three-reactor system.

A reactor system 1010, shown in FIG. 10 in three phases 1001, 1002, and 1003, includes three reactors 1011, 1012, and 1013. At phase 1001, reactor 1011 is in fuel mode, while reactors 1012 and 1013 are in air mode. At phase 1002, reactor 1012 is in fuel mode, while reactors 1011 and 1013 are in air mode. At phase 1003, reactor 1013 is in fuel mode, while reactors 1011 and 1012 are in air mode. In effect, fuel mode is assigned to reactors 1011, 1012, and 1013 in a round-robin fashion. At all times, the number of reactors in air mode is double the number in fuel mode. Power generation can continue indefinitely through multiple redox cycles with phases 1001, 1002, and 1003.

Figure 11:
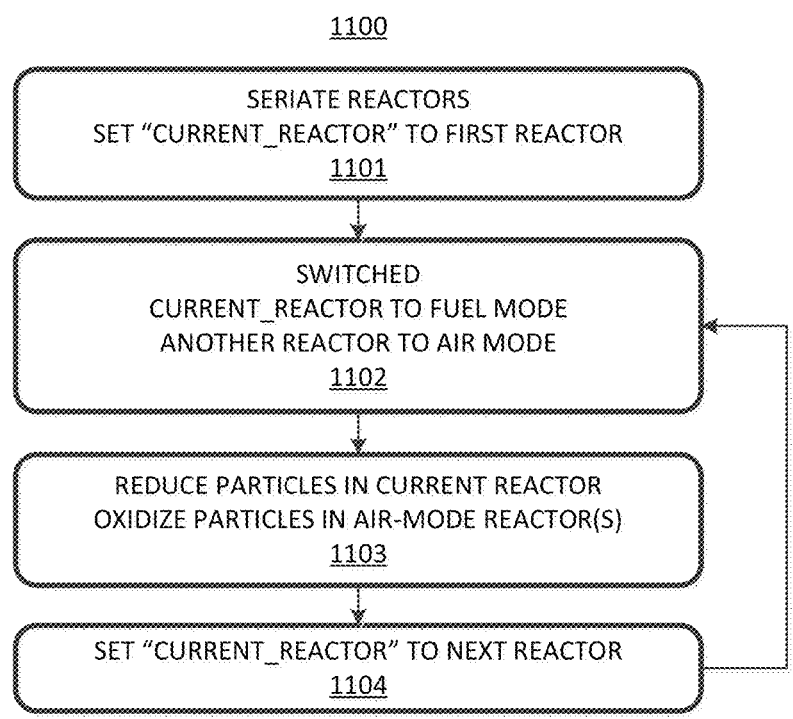
FIG. 11 is a flow chart of a cyclical process for operating reactor systems such as those of FIGS. 1 and 10.

A process 1100, flow-charted in FIG. 11, provides for systems in which fuel mode is assigned to reactors in a round-robin fashion. At 1101, the reactors are seriated. In other words, an order is assigned to the reactors so that a first reactor can be identified, a second reactor can be identified, and so on, depending on the total number of reactors. "CURRENT_REACTOR" is to be used as a iterating variable that increments through phases of process 1100. At 1101, the CURRENT_REACTOR is set to the first reactor.

At 1102, the CURRENT_REACTOR is switched to fuel mode, while another reactor is switched to air mode. If there are additional reactors, they are not switched in the present iteration of action 1102. For example, referring back to FIG. 10, in the transition from phase 1001 to phase 1002, reactor 1012 is the CURRENT_REACTOR, and reactor loll is the "another reactor", that is switched to air mode. Reactor 1013 remains in air mode, so is not switched. In some larger systems, e.g., a four-reactor system, there can be two or more other reactors that remain in air mode. In other larger systems, one or more reactors may remain in fuel mode at action 1102. For example, in a five reactor system, a first reactor can be switched from air mode to fuel mode, a second reactor can be switched from fuel mode to air mode, a third and a fourth reactor can remain in air mode, while a fifth reactor remains in fuel mode.

At 1103, oxidation particles in the CURRENT_REACTOR and any other reactors in fuel mode are used to combust fuel; in the combustion process, the oxidation particles are reduced. In the meantime, previously depleted particles in the air mode reactors are re-oxidized through reactions with air. At 1104, "CURRRENT_REACTOR" is set to the next reactor. For example, if the reactor identified as first at 1101 is the CURRENT_REACTOR at 1103, then the second reactor becomes the CURRENT_REACTOR at 1104 (beginning the next phase). If the last reactor identified at 1101 is the CURRENT_REACTOR, then the first reactor becomes the current reactor at 1104 (beginning a new redox cycle). Actions 1102-1104 are then iterated indefinitely to provide continuous power through multiple phases and redox cycles.

To minimize the number of air-only tuyeres and, thus, the total number of tuyeres, required to allow the oxidation rate to match the reduction rate, all tuyeres used to distribute fuel can be also used to distribute air. In alternative embodiments, some or all of the fuel tuyeres are fuel-only tuyeres. Throughout this description, specific values for certain parameters have been provided for a specific embodiment. Each of these values may be considered as a median of a range of values that can vary by 20% in either direction for certain similar embodiments. Other embodiments may have very different values for certain parameters while still other embodiments may not have counterparts to some of the parameters mentioned herein.

These and other variations upon and modification to the illustrated embodiments are provided for by the present invention, the scope of which is defined by the following claims.

What is claimed is:

1. A batch-cyclic reduction/oxidation (redox) reactor comprising:
   at least one redox reactor including a reactor vessel and a distributor within the reactor vessel to fluidize oxidation particles, the distributor including multi-jet tuyeres for distributing fuel and air, the multi-jet tuyeres including fuel tuyeres used to distribute fuel and air-only tuyeres used to distribute air but not used to distribute fuel;
   a fluid input system controllably coupling the distributor to sources of air and fuel; and
   a control system coupled to the fluid input system to switch between a fuel mode and an air mode, such that,
   in fuel mode, fuel is combusted and oxidation particles are reduced, fuel being introduced through the fuel tuyeres and not to the air-only tuyeres, and
   in air mode, oxidation particles are oxidized, air being introduced through the air-only tuyeres.

2. The batch-cyclic reactor system of claim 1 wherein a number of the air-only tuyeres is greater than the number of fuel tuyeres and air is also introduced through the fuel tuyeres.

3. The batch-cyclic reactor of claim 2 wherein the number of air-only tuyeres is at least three times the number of fuel tuyeres.

4. The batch-cyclic reactor of claim 1 wherein an average distance of the air-only tuyeres from a central axis of the reactor vessel is greater than the average distance of the fuel-tuyeres from the central axis.

5. The batch-cyclic reactor system of claim 4 wherein the minimum distance of the air-only tuyeres from the central axis is greater than the maximum distance of the fuel-air tuyeres from the central axis.

6. The batch-cyclic redox reactor system of claim 1 wherein each of the tuyeres has an axial input and plural radial outlets, an average number of tuyere outlets for the fuel-air tuyeres being greater than an average number of tuyere outlets for the air-only tuyeres.

7. The batch-cyclic redox reactor system of claim 6 wherein at least some of the fuel-air tuyeres have fewer than 8 radial outlets distributed circumferentially so that one side of the tuyere (at least 90 degrees) has no gas flow.

8. The batch-cyclic redox reactor system of claim 6 wherein an average diameter of the radial outlets for the air-only tuyeres is greater than the average diameter of the radial outlets for the fuel-air tuyeres.

9. The batch-cyclic redox reactor system of claim 1 wherein paths along which fuel and air enter the fuel-air tuyeres are merged within the reactor vessel.

10. The batch-cyclic redox reactor system of claim 1 wherein paths along which fuel and air enter the fuel-air tuyeres are merged outside the reactor vessel.

11. A batch-cyclic redox reactor process comprising:
in an air mode, directing air into a reactor to oxidize resident oxidation particles, the air being directed through reactor tuyeres, the tuyeres including air tuyeres and fuel-air tuyeres, in a vessel of the reactor;
switching from an air mode to a fuel mode;
in the fuel mode, directing fuel into the reactor to combust using the oxidation particles, the fuel being directed through fuel-air tuyeres of the tuyeres and not through air-only tuyeres of the reactor tuyeres; and
switching from the fuel mode to the air mode.

12. The batch-cyclic redox reactor system of claim 11 wherein an average speed at which air exits the tuyeres during the air mode is within a factor of two of an average speed at which fuel exits the fuel-air tuyeres during fuel mode, and the number of moles of air that enter the reactor through the reactor tuyeres per unit time is a factor of at least two times a number of moles of fuel that enters the reactor through the fuel-air tuyeres.

13. The batch-cyclic redox reactor system of claim 12 wherein the factor is at least three.

14. The batch-cyclic redox reactor system of claim 13 wherein the factor is at least seven.

15. The batch-cyclic redox reactor system of claim 11 wherein a pattern of air outputs of a fuel-air tuyere has rotational symmetry, where a pattern of air outputs of an air-only tuyere does not have rotational symmetry.

16. A batch-cyclic redox reactor system comprising:
plural batch-cyclic redox reactors, each including a distributor for fluidizing oxidation particles, the distributor including multi-jet tuyeres, the multi-jet tuyeres including fuel tuyeres and air-only tuyeres;
a fluid handler system for routing, during an air mode of a reactor, air to the air-only tuyeres, and during a fuel mode, fuel to the fluid tuyeres and not to the air-only tuyeres, the tuyeres including tuyere stems; and
a programmed controller that causes at least one reactor to be in air mode when another reactor is in fuel mode.

17. A batch-cyclic redox reactor system as recited in claim 16 wherein the controller is programmed to operate exactly one reactor in fuel mode while the remaining reactors are in air mode, fuel mode being assigned to the reactors sequentially.

18. The batch-cyclic redox reactor system of claim 16 wherein an average diameter of the stem for the air-only tuyeres is greater than an average diameter of the stem for the fuel-air tuyeres.

* * * * *